UNITED STATES PATENT OFFICE.

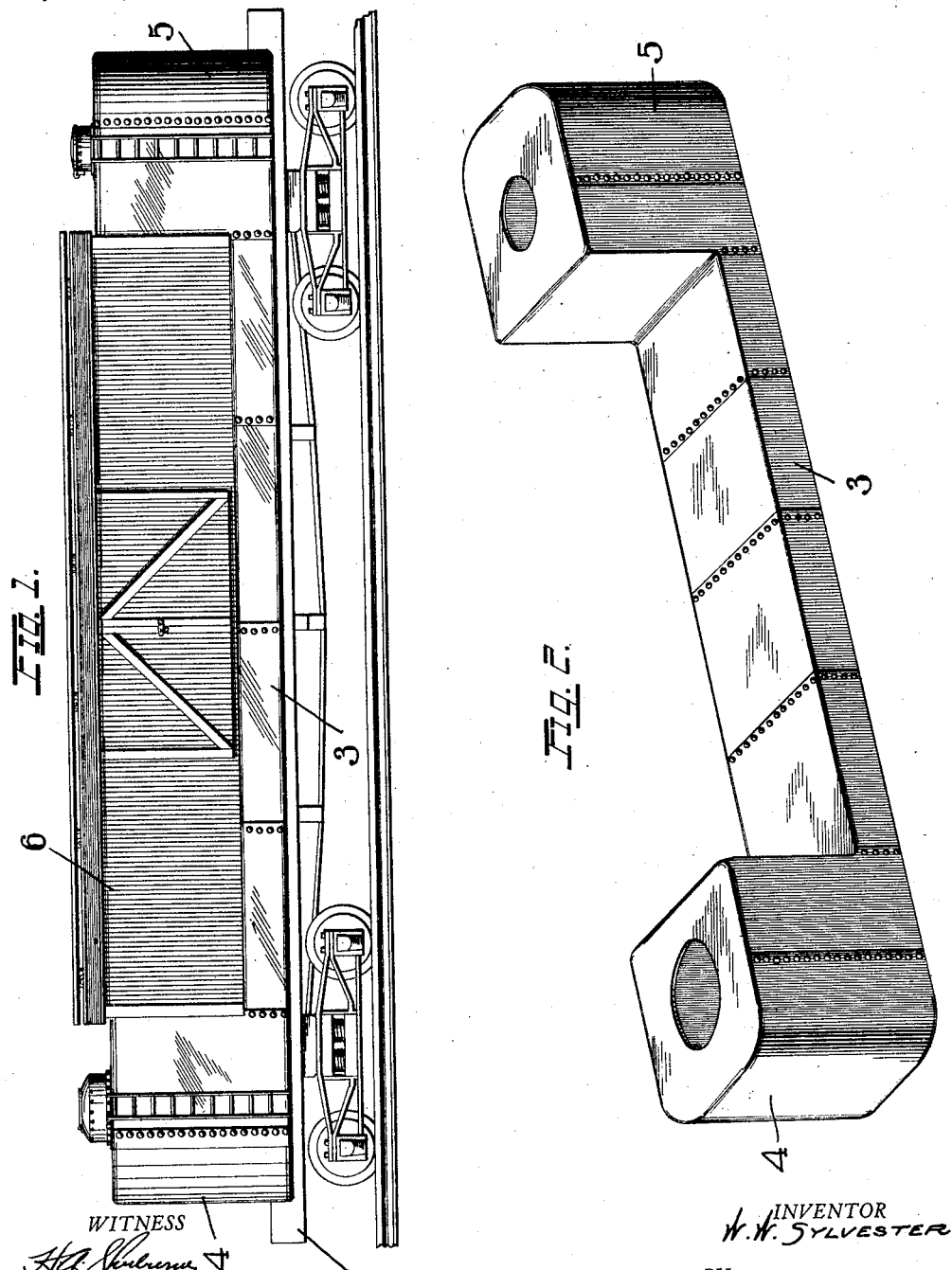

WILLIAM W. SYLVESTER, OF OAKLAND, CALIFORNIA, ASSIGNOR TO MERLE B. MOON, OF SAN FRANCISCO, CALIFORNIA.

RAILWAY-CAR.

1,389,396.	Specification of Letters Patent.	Patented Aug. 30, 1921.

Application filed October 14, 1920. Serial No. 416,950.

*To all whom it may concern:*

Be it known that I, WILLIAM W. SYLVESTER, a citizen of the United States, and a resident of Oakland, county of Alameda, and State of California, have invented a certain new and useful Improvement in Railway-Cars, of which the following is a specification.

This invention relates to cargo carrying cars and particularly to a combined tank and box car.

It is an object of the present invention to provide a car structure including a tank that may be utilized for the transportation of liquid between suitable points and which car also provides for the utilization of carrying capacity of the car when it is not transporting liquid.

It is a further object of the present invention to provide separate cargo carrying means so that the car can be utilized to substantially full carrying capacity for carrying a liquid, such as oil, between given points and enabling the transportation of other character of cargo in a chamber or cargo carrying space separate from the oil tank.

The invention possesses other objects and features of advantage, some of which, with the foregoing, will be made manifest in the following description of the preferred form of the invention which is illustrated in the drawings accompanying and forming part of the specification. It is to be understood that it is not intended to limit the invention to the embodiment shown by the said drawings and description as variations may be adopted within the scope of the invention as set forth in the claims.

Referring to the drawings:—

Figure 1 is a side elevation of the improved car structure, and Fig. 2 is a perspective of one form of tank structure.

In present transportation practice freight cars are specially constructed and provided with tanks for the transportation of liquid, such as oil, and these cars have capacity for transportation of liquids only. It frequently happens that after the transportation of a cargo of liquid between given points that the car has to be returned with an empty tank to some other point to be reloaded with liquid.

By the present invention it is possible to utilize a tank car for the transportation of liquid in one direction of travel of the car to a given destination and it is also possible to utilize the carrying capacity of the car from said destination, or from any other given point, in the transportation of a different character of cargo.

The present invention therefore comprehends a freight car combining a tank for the transportation of liquid and separate means for the transportation of a cargo of a different character. The car may be constructed in various forms and various types or structures of tanks may be erected bodily in the structure of the car or placed thereon; the tank however being preferably so constructed and arranged as to provide not only the desired carrying capacity of liquid but also to provide for carrying a substantially full cargo of other character of freight.

One embodiment of the invention is illustrated in the accompanying drawings in which the car is provided with a platform 2 that may form a part of or upon which may be erected a tank. A form of tank is shown as extending substantially from end to end of the car and comprising a rather shallow intermediate body portion 3 and upstanding end portions 4 and 5. It is understood that the width and the depth of the intermediate portion of the tank 3 and the width and height of the end portions 4 and 5 will all be predetermined according to the desired carrying capacity of the tank. By this form of construction there is provided between the upright portions 4—5 of the tank a longitudinal space of considerable length above the intermediate portion 3 of the tank and this space may be left open as in flat car construction or it may be provided with a housing similar to the usual box-car structure, indicated at 6.

It is to be understood that the present disclosure is but illustrative of one of various types of construction in which the present invention may be embodied.

It will be seen from the above that the disclosed combination freight car may be utilized therefore readily for the transportation of oil or other liquid between given points and that the car instead of being returned or operated as an "empty" may be utilized for the transportation of cargo of a different character and which may be separately stored independently of the tank.

What is claimed is:

1. A railway car comprising a frame, a tank arranged on said frame having deep end portions arranged at the ends of the frame and having filling means at the top and a shallow intermediate portion connecting the lower ends of the deep portions, and forming a flat floor support, the liquid capacity of the tank being substantially equivalent to the carrying capacity of the car and a housing between the end portions.

2. A combined tank and box car in which the box is arranged wholly between upright end portions of the tank, which portions are substantially as high as the box part.

3. A combined tank and box car in which the box is arranged wholly between upright end portions of the tank which portions are substantially as high as the box part, and filling means at the uppermost portion of the tank.

4. A combined tank and box car in which the box is arranged between vertical inner end walls of end portions of the tank.

5. A tank car having a flat shallow body portion with upwardly extending chambers at each end and having inner vertical walls between which is contained a car box.

In testimony whereof, I have hereunto set my hand.

WILLIAM W. SYLVESTER.